United States Patent
Singh et al.

(10) Patent No.: US 6,232,000 B1
(45) Date of Patent: May 15, 2001

(54) ABRASION, CORROSION, AND GALL RESISTANT OVERLAY ALLOYS

(75) Inventors: Daya Singh, Hendersonville; Ravi Menon, Goodlettsville, both of TN (US)

(73) Assignee: Stoody Company, St. Louis, MO (US)

( * ) Notice: Subject to any disclaimer, the term of this patent is extended or adjusted under 35 U.S.C. 154(b) by 0 days.

(21) Appl. No.: 09/221,805

(22) Filed: Dec. 29, 1998

Related U.S. Application Data

(60) Provisional application No. 60/098,353, filed on Aug. 28, 1998.

(51) Int. Cl.[7] ............ B32B 15/04; C22C 38/22; C22C 38/44
(52) U.S. Cl. ............ 428/685; 420/69; 148/325; 492/54; 492/58
(58) Field of Search .............. 428/685; 420/69; 148/325; 492/54, 58

(56) References Cited

U.S. PATENT DOCUMENTS

| | | |
|---|---|---|
| 3,581,054 | 5/1971 | Bjorkroth et al. .......... 219/146 |
| 4,000,010 | 12/1976 | Sekimoto et al. .......... 148/3 |
| 4,331,741 | 5/1982 | Wilson .......... 428/679 |
| 4,409,027 | 10/1983 | Cordea et al. .......... 75/128 |
| 4,561,888 | 12/1985 | Okunda et al. .......... 75/124 |
| 4,568,393 | 2/1986 | Kane et al. .......... 148/6.35 |
| 4,609,577 | 9/1986 | Long .......... 428/683 |
| 4,772,451 | 9/1988 | Andreini et al. .......... 420/106 |
| 4,861,549 | 8/1989 | Khare .......... 420/109 |
| 4,897,519 | 1/1990 | Clark .......... 219/76.14 |
| 5,081,760 | 1/1992 | Kikuhara et al. .......... 29/130 |
| 5,519,186 | 5/1996 | Sakurai et al. .......... 219/146.23 |
| 5,531,659 | 7/1996 | Fusada .......... 492/48 |
| 5,599,497 | 2/1997 | Cordea et al. .......... 420/109 |

OTHER PUBLICATIONS

Daya Singh, Microstructure and Properties of Ultra Low Carbon Bainitic Steel Weld Metal for HSLA–100, Jan. 1996.

*Primary Examiner*—Deborah Jones
*Assistant Examiner*—Jason Savage
(74) *Attorney, Agent, or Firm*—Senniger, Powers, Leavitt & Roedel

(57) ABSTRACT

An overlayer for a use on industrial components such as steel mill caster rolls which require enhanced abrasion, corrosion, and gall resistance. The overlayer has relatively lower carbon levels and relatively higher molybdenum levels relative to other alloys used as overlayers, The overlayer has reduced susceptibility to sensitization and enhanced corrosion resistance.

22 Claims, 2 Drawing Sheets

Alloy 2 as welded.
100x

Alloy 423 as welded.
100x

Alloy 2 after sensitization.
100x

Alloy 423 after sensitization.
100x

ABRASION, CORROSION, AND GALL RESISTANT OVERLAY ALLOYS

CROSS REFERENCE TO RELATED APPLICATION

This application is a U.S. formal application claiming priority of U.S. Provisional Ser. No. 60/098,353, filed Aug. 28, 1998.

BACKGROUND OF THE INVENTION

This invention relates to an alloy for use in overlaying industrial components subjected to manufacturing and service conditions requiring abrasion, corrosion and galling resistance. An example of such an application is for use in coating and reconditioning steel mill caster rolls.

Steel mill caster rolls typically have a core substrate, a build-up layer, and an overlayer or stainless steel overlay. Continuous caster rolls in steel mills are overlaid with, for example, 400 series martensitic stainless steel containing, by weight, chromium ranging from 10–15%, nickel below 5%, and molybdenum around 1%. The carbon content of these steels usually varies from 0.15 to 0.2%. A typical composition for overlay alloy currently being used in the industry is Alloy 423, which has the following composition, by weight percent:

| | |
|---|---|
| C | 0.12 |
| Mn | 1.2 |
| Si | 0.4 |
| Cr | 13.5 |
| Ni | 2.5 |
| Mo | 1.2 |
| V | 0.18 |
| Cb | 0.18 |
| Fe | Balance |

Overlay alloys used in reconditioning steel mill rolls are typically deposited by welding. A resulting problem sought to be addressed by the current invention is that weld deposits of these alloys are susceptible to stress corrosion cracking along interbead heat affected zones. Deposition by welding therefore increases the frequency of circumferential cracking and surface deterioration due to corrosion and wear, two common life-limiting factors in caster rolls. These problems have been correlated to thermal cycling caused by the welding process itself, subsequent service conditions in the steel mill, and carbon content of the overlay.

Thermal cycling in the welding deposition process and subsequent exposure in service can result in the formation of carbides along grain boundaries, which decreases corrosion resistance along the grain boundaries, which in turn tends to lead to circumferential cracks. In particular, Cr carbides, the majority of which are known to be the $M_{23}C_6$ type (M represents a metallic ion such as Fe or Cr), develop in the temperature range of 750° F. to 1300° F. Because it is necessary to deposit numerous weld beads adjacent one another to cover large surfaces, thermal cycling occurs as part of an already deposited, cooled bead is heated to within the temperature range of 750° F. to 1300° F., resulting in the formation of carbides along the grain boundaries. Sensitization occurs as Cr-depleted regions form next to grain boundaries, lowering the corrosion resistance along the grain boundaries. During service sensitized interbead regions undergo preferential pitting corrosion attack. Pits formed in this manner act as crack nucleation sites from which the circumferential cracks initiate. The effects of sensitization can be relieved by heat treatment because carbides are known to go back into solution above 1800° F. In view of the expense and effort involved in desensitizing heat treatment, however, especially of large industrial components, it would be preferable to minimize or avoid sensitization altogether.

Lowering carbon content of the deposited alloy can minimize susceptibility to sensitization by reducing the amount of C available for Cr carbide formation, but reduction in C content tends to reduce the hardness of martensite in the alloy. Lower hardness levels, due to reduced carbon, can result in poor wear and galling resistance. Attempts have been made to substitute carbon with nitrogen, although only in open arc wire deposits with limited success.

Increasing Cr content has been considered to combat sensitization, but a Cr content above 13–14% upsets the ferrite balance resulting in lower hardness, as the hardness of overlay alloys of this type is mainly governed by the ferrite balance and the C content.

SUMMARY OF THE INVENTION

It is an object of the invention, therefore, to provide an alloy for overlaying industrial components subjected to manufacturing and service conditions requiring resistance to high-temperature abrasion, corrosion and galling; to provide an alloy for use in overlaying and reconditioning steel mill caster rolls; to provide such an alloy which has reduced susceptibility to sensitization; to provide such an alloy which has enhanced resistance to circumferential cracking; to provide such an alloy which can be readily deposited using easily manufactured wire.

Briefly, therefore, the invention is directed to a high Mo, low C overlayer on a steel mill caster roll, the overlayer having a thickness in the range of from about ¼ to about ¾ inch, the overlayer having been deposited onto the caster roll by welding deposition, the overlayer comprising an alloy exhibiting no appreciable precipitation of Cr carbides at the grain boundaries upon a sensitization treatment of 925° F. for 24 hours and therefore exhibiting enhanced corrosion resistance, and the overlayer comprising C in the range of about 0.01 to 0.09 weight percent and Mo in the range of about 1.7 to 4.0 weight percent.

The invention is also directed to an alloy for use in overlaying industrial components to be subjected to conditions requiring resistance to abrasion, corrosion, and galling, the alloy comprising the following constituents, by weight percent:

| | |
|---|---|
| C | 0.01–0.09, |
| Cr | 11.0–13.0 |
| Ni | 3.0–5.0 |
| Mo | 1.7–4.0 |
| V | 0.5–1.0 |
| W | 0.5–1.0 |
| Mn | Up to 2.0 |
| Fe | balance. |

In another aspect, the invention is directed to a steel mill caster roll comprising a cast or forged steel core having a diameter in the range of about between about 6 to about 13 inches, a low alloy steel build up layer having a thickness in the range of about ¼ to about ¾ inches, and a high Mo, low C overlayer having a thickness in the range of from about ¼ to about ¾ inch, the overlayer having been deposited onto the caster roll by welding deposition, the overlayer comprising an alloy exhibiting no appreciable precipitation of Cr carbides at the grain boundaries upon a sensitization treatment of 925° F. for 24 hours and therefore exhibiting enhanced corrosion resistance, and the overlayer comprising C in the range of about 0.01 to 0.09 weight percent and Mo in the range of about 1.7 to 4.0 weight percent.

Other objects and features of the invention will be in part apparent and in part pointed out hereinafter.

DETAILED DESCRIPTION OF THE INVENTION

Figure 1:
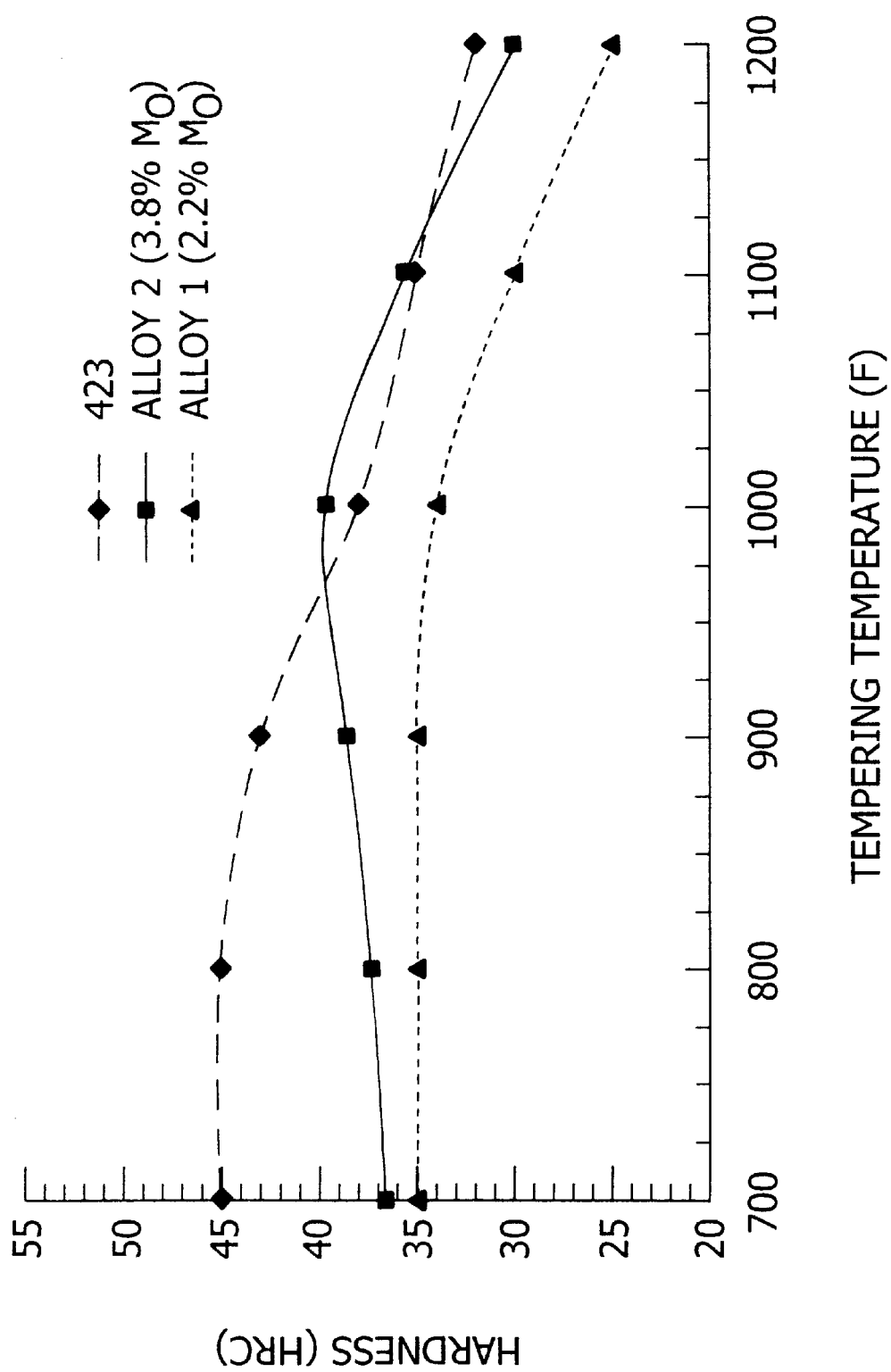
FIG. 1 is a graph comparing the tempering curves for alloys of the invention to a tempering curve for a prior art alloy.
Figure 2A:
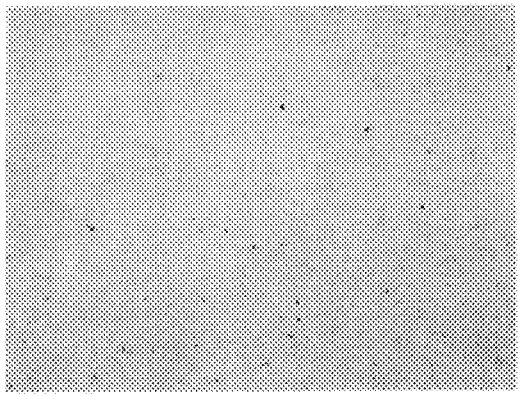
FIG. 2 contains photomicrographs comparing the microstructure of an alloy of the invention to the microstructure of a prior art alloy.
Figure 2B:
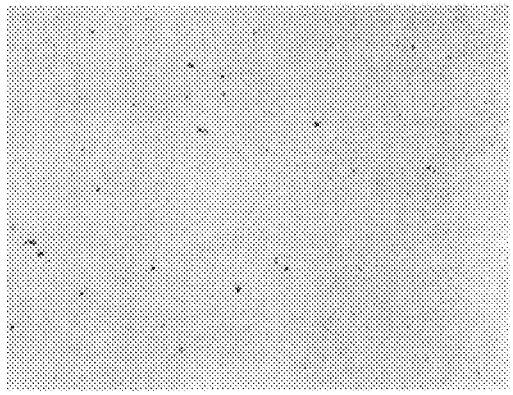
Figure 2C:
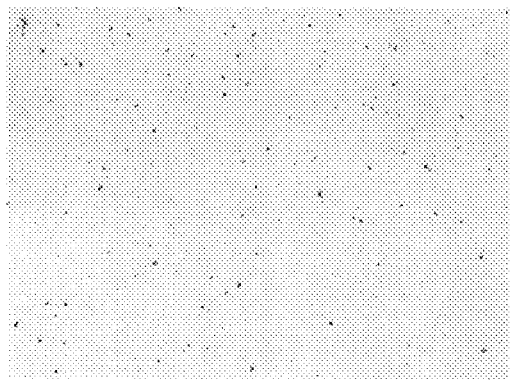
Figure 2D:
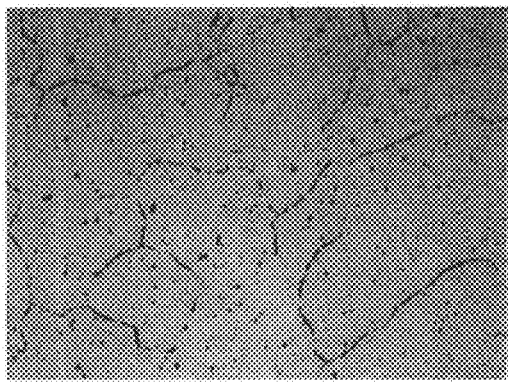

The alloy of this invention is a low carbon high molybdenum overlay alloy with improved corrosion and wear resistance. The alloy has good ductility, and firecrack resistance, and is especially suitable as an overlay alloy for caster rolls.

Hardness and corrosion resistance are critical properties for overlay alloys for steel mill caster rolls and components subject to similar service environments. Ductility is also important to resist cracking, as the rolls do tend to flex to varying degrees in service. The invention involves a new inventive approach to achieving these properties required for steel mill caster rolls. Molybdenum additions are dramatically increased to provide acceptable hardness, while C levels relied on in prior approaches are dramatically reduced. This approach is distinct from the prior approach in that the reduced C content minimizes depletion of Cr from grain boundaries which can occur as, upon heating, Cr carbides form. By minimizing this Cr depletion, the approach to obtaining hardness taken by this invention preserves corrosion resistance.

The C content of the alloy of the invention is preferably in the range of 0.01 to 0.09%, more preferably in the range of 0.03% to about 0.08%. The alloy of the invention contains a maximum carbon content of about 0.09%. All percentages noted in this specification are by weight. Carbon increases the maximum attainable hardness, but carbon contents are maintained below the above upper limit to limit the availability of C to form Cr carbides. Thus sensitization and the tendency for pit corrosion initiating in Cr-depleted zones along grain boundaries are reduced by maintaining C contents in the above ranges, which are relatively low in comparison to prior overlay alloys for similar applications. The corrosion pits avoided by this invention are known to initiate cracking in the overlay deposit when subjected to thermal and mechanical cycling. Acceptable hardness is achieved with this invention by use of Mo in the elevated ranges described more fully below.

The alloy of the invention contains from about 0.5% to about 1% V, preferably from about 0.7% to about 0.8% to provide strength at elevated temperatures and to inhibit sensitization. Vanadium values significantly above about 1% are avoided because such values can lead to a loss in toughness. Vanadium values significantly below about 0.5% are avoided because no strengthening effect is seen below about 0.5%.

The alloy of the invention contains from about 11% to about 13% Cr, preferably from about 11.5% to about 12.5%, to provide corrosion and heat resistance. Chromium in the context of the present alloys provides corrosion resistance and high temperature strength. Chromium values significantly above about 13% are avoided in order to avoid upsetting the ferrite balance in the alloy, which balance must be maintained for adequate toughness. Chromium values significantly below about 11% are avoided because of negative influence on corrosion resistance.

The alloy of the invention contains from about 0.5% to about 1% W, preferably from about 0.7% to about 0.8%, to provide strength at elevated temperatures. Tungsten values significantly above about 1% are avoided due to a potential for loss in toughness. Tungsten values significantly below about 0.5% are avoided due to a potential for loss in high temperature strength.

Silicon is tolerated in the alloy as an incidental impurity in amounts up to about 1%, and is typically present in amounts in the range of about 0.3% to about 1%.

The alloy of the invention contains from about 3.0% to about 5.0% Ni, preferably from about 4.0 to about 4.5%, to control the ferrite content of the overlay. Nickel values significantly above about 5.0% are avoided due to the potential to retain austenite. Nickel values significantly below about 3.5% are avoided because of the potential for excessive ferrite retention.

Molybdenum is incorporated in the alloy in the range of from about 1.7 to 4.0% for its solid solution strengthening effect and enhancement of corrosion resistance. While the Mo content of overlay steels previously in use in caster roll applications has been around 1.0%, the alloys of the invention employ significantly greater Mo contents. It has been discovered that hardness, ductility, and corrosion resistance can be controlled by controlling the Mo content within the specific range of the invention, and that interbead circumferential cracking can be minimized. One preferred embodiment of the invention contains between about 3.0 and about 4.0% Mo, preferably between about 3.6 and 3.9% Mo, most preferably about 3.8% Mo. This embodiment is especially preferred in applications of split body caster rolls, where there are two abutting rolls forming one functional roll. The two rolls separately are relatively shorter than a single roll, and thus do not flex as much in the middle as does a longer, single segment roll. A Mo content of, e.g., 3.8% provides increased yield strength, increased wear resistance, and increased corrosion resistance. Because these rolls flex less, a decrease in ductility (% elongation) commensurate with increased yield strength is tolerable.

A second preferred embodiment of the invention contains between about 1.7 and about 2.5% Mo, preferably between 2.1 and 2.4% Mo, most preferably about 2.2% Mo. This embodiment is ideal for use as an overlay in connection with wide body caster rolls, which rolls tend to flex more in the middle, therefore, ductility of the alloy is more important.

While wide body caster rolls are typically on the order of about 4 to 5 feet wide, the split body rolls are on the order of roughly 2 to 3 feet wide. Caster rolls of this nature are roughly on the order of about 5 to about 14 inches in diameter, which includes an overlayer about ¼ to about ½ inch thick, preferably about ⅜ inch thick. The overlayer is deposited in about 3 to about 4 welding passes, and thus includes about 3 to about 4 layers about ⅛ inch thick each. The preferred deposition procedure is submerged arc welding using an alloy cored wire.

Such caster rolls also have a build up layer about ¼ to about ¾ inch underneath the overlayer. Depending on the amount of reconditioning required, the thickness of the build up layer may be, for example, ⅜ inch thick. There is a substrate core underneath the build up layer providing the remaining diameter of about 4 to about 13 inches. The build up layer is deposited in about 3 to about 5 welding passes. The build up layer preferably comprises one of the following low alloy steels, most preferably Alloy A, as disclosed in co-pending application 09/119,920, the entire disclosure of which is incorporated by reference:

|    | A     | B     | C     |
|----|-------|-------|-------|
| C  | 0.04  | 0.15  | 0.09  |
| Mn | 1.5   | 1.0   | 0.87  |
| Si | 0.4   | 0.39  | 0.5   |
| Cr | —     | 0.6   | 0.88  |
| Ni | 2.5   | 0.57  | 1.26  |
| Mo | 0.6   | 0.2   | 0.41  |
| Ti | 0.03  | —     | —     |
| V  | —     | —     | 0.15  |
| P  | 0.012 | 0.015 | 0.015 |
| S  | 0.006 | 0.004 | 0.004 |
| Fe | Bal.  | Bal.  | Bal.  |

The overlayer of the invention is an alloy with a microstructure having less than about 10% ferrite, and is martensite with some retained austenite.

The alloy contains the following constituents by weight percent:

| C  | 0.01–0.09     |
|----|---------------|
| Si | up to about 1.0 |
| Cr | 11.0–13.0     |
| Ni | 3.0–5.0       |
| Mo | 1.7–4.0       |
| V  | 0.5–1.0       |
| W  | 0.5–1.0       |
| Fe | Balance       | plus incidental trace elements.

One specifically preferred embodiment contains the following constituents, by weight percent:

| C  | 0.01–0.09     |
|----|---------------|
| Si | up to about 1.0 |
| Cr | 11.0–13.0     |
| Ni | 3.0–5.0       |
| Mo | 3.0–4.0       |
| V  | 0.5–1.0       |
| W  | 0.5–1.0       |
| Fe | Balance       | plus incindental trace elements.

Another specifically preferred embodiment contains the following constituents, by weight percent:

| C  | 0.03–0.08  |
|----|------------|
| Si | up to 1.0  |
| Cr | 11.5–12.5  |
| Ni | 4.0–4.5    |
| Mo | 3.6–3.9    |
| V  | 0.7–0.8    |
| W  | 0.7–0.8    |
| Fe | Balance    | plus incidental trace elements.

Another specifically preferred embodiment contains the following constituents, by weight percent:

| C  | 0.01–0.09 |
|----|-----------|
| Si | up to 1.0 |
| Cr | 11.0–13.0 |
| Ni | 3.0–5.0   |
| Mo | 1.7–2.5   |
| V  | 0.5–1.0   |
| W  | 0.5–1.0   |
| Fe | Balance   | plus incidental trace elements.

Another specifically preferred embodiment contains the following constituents, by weight percent:

| C  | 0.03–0.08 |
|----|-----------|
| Si | up to 1.0 |
| Cr | 11.5–12.5 |
| Ni | 4.0–4.5   |
| Mo | 2.0–2.5   |
| V  | 0.7–0.8   |
| W  | 0.7–0.8   |
| Fe | Balance   | plus incidental trace elements.

Manganese is optionally included in each of the foregoing compositions in amounts up to about 2%, and optionally in the range of about 1 to 2%.

The invention is further illustrated by the following example.

Example

Two alloy samples according to the invention were prepared having the following constituents, by weight:

|    | Alloy 1  | Alloy 2  |
|----|----------|----------|
| C  | .07      | .06      |
| Mn | .9       | .7       |
| Si | .5       | .4       |
| Cr | 12.4     | 12.7     |
| Ni | 4.3      | 5.5      |
| Mo | 2.2      | 3.8      |
| V  | .7       | .8       |
| W  | .6       | .8       |
| Fe | Balance  | Balance  |

These compositions correspond to the overall wire composition consisting of alloy powder in C1008 sheath.

Tensile testing was carried out at room temperature, 00° F., and 1200° F. Samples were prepared by welding onto ¾ inch thick A36 steel plates with a 45° 'V' groove by submerged arc welding. The current was 450 amps; the voltage was 28 volts; the travel speed was 16 inches/minute; the heat input was 47 kJ/inch; and the flux was neutral basic. The welds were made according to standard procedure ANSI/AWS A5.17-89. Tensile specimens (0.5 inch diameter) were extracted from the weld centerline according to ANSI/AWS B4.0 and tested in accordance with ASTM E8-95a and E21-92. These standards apply to all tensile tests discussed in this application.

The tensile test results are shown in Table I. These data show that even with carbon levels lower than that of the 423 alloy, the Alloys 1 and 2 of the invention have comparable or better yield strength values than that of the 423 at room temperature and 800° F. At 1200° F. the yield strength of Alloy 1 is only slightly lower than that of 423. Alloys 1 and 2 have higher ductility at 800° F. and 1200° F. as indicated by the elongation values, which higher ductility corresponds to reduction in crack propagation, thereby increasing the life of the component to which the alloy is applied. Each of the alloys of the invention are characterized by a tensile ductility of greater than about 10% elongation at 800° F. and greater than about 25% elongation at 1200° F. when evaluated under standard ASTM E8-95a. All tensile tests discussed in this application are in accordance with ASTM E8-95a.

TABLE I

Tensile Test Results

| Temp (° F.) | Alloy | Y.S. (ksi) | U.T.S. (ksi) | El. (%) | R.A. (%) |
|---|---|---|---|---|---|
| 78 | 423 | 132.6 | 167.0 | 12.0 | 34.9 |
|  | Alloy 2 | 134.4 | 166.3 | 15.0 | 40.6 |
|  | Alloy 1 | 147.5 | 164.0 | 13.5 | 36.9 |
| 800 | 423 | 130.7 | 112.7 | 7.0 | 22.3 |
|  | Alloy 2 | 102.2 | 132.9 | 11.5 | 38.2 |
|  | Alloy 1 | 112.4 | 139.0 | 11.5 | 35 |
| 1200 | 423 | 54.4 | 69.9 | 24.0 | 71.5 |
|  | Alloy 2 | 36.6 | 52.3 | 29.5 | 73.1 |
|  | Alloy 1 | 26.8 | 41.0 | 36.5 | 79.0 |

Temper response tests were performed on the alloys by heating the samples to a particular temperature and holding at that temperature for a specific time. Hardness measurements were taken after cooling the samples to room temperature. The temper responses of the weld deposits of Alloy 1 and 2 and 423 are shown in FIG. 1. Alloy 2, which has 3.8% Mo, has comparable hardness values for tempering of 1000° F. and above. Alloy 1, which has 2.2% Mo, was designed to have lower hardness for specific applications, in particular, for wide body caster rolls. These tempering curves for Alloys 1 and 2 reveal that acceptable hardness levels comparable to alloy 423 are achievable with these alloys, despite the fact that their carbon levels have been decreased to improve resistance to sensitization, and to achieve improved corrosion resistance.

To test for sensitization, the weld deposits of Alloy 2 and 423 were sensitized at 925° F. in air for 24 hours, polished and etched with Lepara's etchant. Lepara's etchant is specifically designed to attack carbides, and contains equal amounts of 1% $Na_2S_2O_5$ in water and 4% picric acid in ethanol. A comparison of the samples before and after sensitization is shown in FIG. 2. Alloys 2 and 423 do not show any appreciable carbides in the as-welded condition. After sensitization treatment the 423 deposit shows a continuous network of carbides along the grain boundaries indicating extensive sensitization causing decreased corrosion resistance. Alloy 2 did not show any change from the welded condition indicating absence of sensitization and consequently improved corrosion resistance. An overlayer of the alloy of the invention on a steel mill caster roll therefore exhibits no appreciable precipitation of Cr carbides at grain boundaries upon sensitization treatment of 925° F. in air for 24 hours, and therefore exhibits enhanced corrosion resistance. It is to be understood that this characterization is at 100X magnification as in FIG. 2.

Firecrack tests were performed on Alloys 1, 2 and 423. A firecrack test is a laboratory simulation that involves repeated flame heating and water quenching of the weld metal for 1000 cycles in a special fixture. An alloy deposit was made on a 3 in.×4 in.×12 in. carbon steel block. The deposit surface was machined down ⅛ in and polished to 600 grit prior to testing. The test results for Alloys 1, 2 and 423 are shown in Table II. The 423 alloy in as welded condition had 14 cracks. The 423 sample which was heated at 1000° F. for 8 hours to relieve stress had ten cracks. Alloy 2 had one crack in the as welded condition. Alloy 1 did not show any cracking even in the as welded condition. The firecrack test results indicate that Alloys 1 and 2 have better thermal fatigue resistance compared to the 423 alloy.

Standard ASTM G-65 wear tests were carried out on the firecrack block deposits for Alloys 1, 2 and 423. The test results are shown in Table III. Both Alloy 1 and 2 have less weight loss after 6000 revolutions than 423, indicating superior wear resistance. This ASTM standard applies to all wear tests discussed in this application.

TABLE II

Fire-Crack Test Results

| Material | Heat Treatment | Overlay HRC | Interflame HRC | No. of Cracks |
|---|---|---|---|---|
| 423 | As-Welded | 43 | 26 | 14 |
| 423 | 8 hr @ 1000° F. | 42 | 35 | 10 |
| 423 | 8 hr @ 1150° F. | 37 | 39 | 0 |
| Alloy 2 | As-Welded | 37 | 27 | 1 |
| Alloy 1 | As-Welded | 35 | 24 | 0 |

TABLE III

Wear Test Results

|  | Alloy | HRC | Number of Layers | Rev. | Wt. Loss (gm) |
|---|---|---|---|---|---|
| 1 | 423 | 45 | 6 | 6000 | 2.65 |
| 2 | Alloy 2 | 37 | 6 | 6000 | 2.07 |
| 3 | Alloy 1 | 35 | 6 | 6000 | 2.11 |

As various changes could be made in the above embodiments without departing from the scope of the invention, it is intended that all matter contained in the above description shall be interpreted as illustrative and not in a limiting sense.

What is claimed is:

1. A high Mo, low C overlayer on a steel mill caster roll, the overlayer having a thickness in the range of from about ¼ to about ¾ inch, the overlayer having been deposited onto the caster roll by welding deposition, the overlayer comprising an alloy exhibiting no appreciable precipitation of Cr carbides at the grain boundaries upon a sensitization treatment of 925° F. for 24 hours and therefore exhibiting enhanced corrosion resistance, and the overlayer comprising C in the range of about 0.01 to 0.09 weight percent and Mo in the range of about 1.7 to 4.0 weight percent.

2. The overlayer on a steel mill caster roll of claim 1 consisting essentially of, by weight percent:

| C | 0.01–0.09 |
|---|---|
| Cr | 11.0–13.0 |
| Ni | 3.0–5.0 |
| Mo | 3.0–4.0 |
| V | 0.5–1.0 |

-continued

| | |
|---|---|
| W | 0.5–1.0 |
| Mn | up to about 2.0 |
| Fe | Balance. |

3. The overlayer on a steel mill caster roll of claim 2 consisting essentially of, by weight percent:

| | |
|---|---|
| C | 0.03–0.08 |
| Mn | up to about 2.0 |
| Cr | 11.5–12.5 |
| Ni | 4.0–4.5 |
| Mo | 3.6–3.9 |
| V | 0.7–0.8 |
| W | 0.7–0.8 |
| Si | less than 1.0 |
| Fe | Balance. |

4. The overlayer on a steel mill caster roll of claim 1 consisting essentially of, by weight percent:

| | |
|---|---|
| C | 0.06 |
| Mn | 0.7 |
| Si | 0.4 |
| Cr | 12.7 |
| Ni | 5.5 |
| Mo | 3.8 |
| V | 0.8 |
| W | 0.8 |
| Fe | Balance. |

5. The overlayer on a steel mill caster roll of claim 1 consisting essentially of, by weight percent:

| | |
|---|---|
| C | 0.01–0.09 |
| Cr | 11.0–13.0 |
| Ni | 3.0–5.0 |
| Mo | 1.7–2.5 |
| V | 0.5–1.0 |
| W | 0.5–1.0 |
| Mn | up to about 2.0 |
| Fe | Balance. |

6. The overlayer on a steel mill caster roll of claim 5 consisting essentially of, by weight percent:

| | |
|---|---|
| C | 0.03–0.08 |
| Mn | up to about 2.0 |
| Cr | 11.5–12.5 |
| Ni | 4.0–4.5 |
| Mo | 2.1–2.4 |
| V | 0.7–0.8 |
| W | 0.7–0.8 |
| Si | less than 1.0 |
| Fe | Balance. |

7. The overlayer of claim 6 consisting essentially of, by weight percent:

| | |
|---|---|
| C | 0.07 |
| Mn | 0.9 |

-continued

| | |
|---|---|
| Si | 0.5 |
| Cr | 12.4 |
| Ni | 4.3 |
| Mo | 2.2 |
| V | 0.7 |
| W | 0.6 |
| Fe | Balance. |

8. An alloy for use in overlaying industrial components to be subjected to conditions requiring resistance to abrasion, corrosion, and galling, the alloy comprising the following constituents, by weight percent:

| | |
|---|---|
| C | 0.01–0.09 |
| Cr | 11.0–13.0 |
| Ni | 3.0–5.0 |
| Mo | 1.7–4.0 |
| V | 0.5–1.0 |
| W | 0.5–1.0 |
| Fe | balance. |

9. The alloy of claim 8 consisting essentially of, by weight percent:

| | |
|---|---|
| C | 0.01–0.09 |
| Mn | up to about 2.0 |
| Cr | 11.0–13.0 |
| Ni | 3.0–5.0 |
| Mo | 3.0–4.0 |
| V | 0.5–1.0 |
| W | 0.5–1.0 |
| Si | less than 1.0 |
| Fe | Balance. |

10. The alloy of claim 9 consisting essentially of, by weight percent:

| | |
|---|---|
| C | 0.03–0.08 |
| Mn | up to about 2.0 |
| Cr | 11.5–12.5 |
| Ni | 4.0–4.5 |
| Mo | 3.6–3.9 |
| V | 0.7–0.8 |
| W | 0.7–0.8 |
| Si | less than 1.0 |
| Fe | Balance. |

11. The alloy of claim 8 consisting essentially of, by weight percent:

| | |
|---|---|
| C | 0.01–0.09 |
| Cr | 11.0–13.0 |
| Ni | 3.0–5.0 |
| Mo | 1.7–2.5 |
| V | 0.5–1.0 |
| W | 0.5–1.0 |
| Mn | up to about 2.0 |
| Fe | Balance. |

12. The alloy of claim 11 consisting essentially of, by weight percent:

| | |
|---|---|
| C | 0.03–0.08 |
| Mn | up to about 2.0 |
| Cr | 11.5–12.5 |
| Ni | 4.0–4.5 |
| Mo | 2.1–2.4 |
| V | 0.7–0.8 |
| W | 0.7–0.8 |
| Si | less than 1.0 |
| Fe | Balance. |

13. The alloy of claim 12 consisting essentially of, by weight percent:

| | |
|---|---|
| C | 0.07 |
| Mn | 0.9 |
| Si | 0.5 |
| Cr | 12.4 |
| Ni | 4.3 |
| Mo | 2.2 |
| V | 0.7 |
| W | 0.6 |
| Fe | Balance. |

14. The alloy of claim 8 exhibiting no appreciable precipitation of Cr carbides at the grain boundaries upon a sensitization treatment of 925° F. for 24 hours and therefore exhibiting enhanced corrosion resistance.

15. The alloy of claim 14 having ductility characterized by a tensile ductility of greater than about 10% elongation at 800° F. and greater than about 25% elongation at 1200° F. when evaluated under standard ASTM E8-95a.

16. A steel mill caster roll comprising a cast or forged steel core having a diameter in the range of about between about 6 to about 13 inches, a low alloy steel build up layer having a thickness in the range of about ¼ to about ¾ inches, and a high Mo, low C overlayer having a thickness in the range of from about ¼ to about ¾ inch, the overlayer having been deposited onto the caster roll by welding deposition, the overlayer comprising an alloy exhibiting no appreciable precipitation of Cr carbides at the grain boundaries upon a sensitization treatment of 925° F. for 24 hours and therefore exhibiting enhanced corrosion resistance, and the overlayer comprising C in the range of about 0.01 to 0.09 weight percent and Mo in the range of about 1.7 to 4.0 weight percent.

17. The steel mill caster roll of claim 16 wherein the overlayer is an alloy consisting essentially of the following, by weight percent:

| | |
|---|---|
| C | 0.01–0.09 |
| Cr | 11.0–13.0 |
| Ni | 3.0–5.0 |
| Mo | 1.7–4.0 |
| V | 0.5–1.0 |
| W | 0.5–1.0 |
| Mn | Up to 2.0 |
| Fe | balance. |

18. The steel mill caster roll of claim 17 wherein the overlayer is an alloy consisting essentially of the following, by weight percent:

| | |
|---|---|
| C | 0.01–0.09 |
| Cr | 11.0–13.0 |
| Ni | 3.0–5.0 |
| Mo | 1.7–2.5 |
| V | 0.5–1.0 |
| W | 0.5–1.0 |
| Mn | Up to 2.0 |
| Fe | balance. |

19. The steel mill caster roll of claim 18 having a width of from about 4 to about 5 feet.

20. The steel mill caster roll of claim 17 wherein the overlayer is an alloy consisting essentially of the following, by weight percent:

| | |
|---|---|
| C | 0.01–0.09 |
| Cr | 11.0–13.0 |
| Ni | 3.0–5.0 |
| Mo | 3.0–4.0 |
| V | 0.5–1.0 |
| W | 0.5–1.0 |
| Mn | Up to 2.0 |
| Fe | balance. |

21. The steel mill caster roll of claim 20 having a width of from about 2 to about 3 feet.

22. A steel mill caster roll comprising a cast iron core having a diameter in the range of about between about 6 to about 13 inches, a low alloy steel build up layer having a thickness in the range of about ¼ to about ¾ inches, and a high Mo, low C overlayer having a thickness in the range of from about ¼ to about ¾ inch, the overlayer having been deposited onto the caster roll by welding deposition, the overlayer comprising an alloy exhibiting no appreciable precipitation of Cr carbides at the grain boundaries upon a sensitization treatment of 925° F. for 24 hours and therefore exhibiting enhanced corrosion resistance, the overlayer comprising an alloy having a tensile ductility of greater than about 10% elongation at 800° F. and greater than about 25% elongation at 1200° F. when evaluated under standard ASTM E8-95a, and the overlayer consisting of an alloy consisting essentially of the following, by weight percent:

| | |
|---|---|
| C | 0.01–0.09 |
| Cr | 11.0–13.0 |
| Ni | 3.0–5.0 |
| Mo | 1.7–4.0 |
| V | 0.5–1.0 |
| W | 0.5–1.0 |
| Mn | Up to 2.0 |
| Fe | balance. |

* * * * *